United States Patent
Bedjukh et al.

(10) Patent No.: US 6,391,930 B1
(45) Date of Patent: May 21, 2002

(54) DEVICE FOR DESTROYING TIRES WITH METALLIC CORDS USING ELECTRIC DISCHARGES

(76) Inventors: Aleksandr Radiyevich Bedjukh, 30/20 Svetlickogo st., apt. 70, 254215, Kiev (UA); Tatyana Vasilyevna Parubochaya, 14 Gradinskaya st., apt. 90, 253222, Kiev (UA); Valeri Grigoryevich Butko, 8, Reznitskaya st., apt. 90, 252010, Kiev (UA)

( * ) Notice: Subject to any disclaimer, the term of this patent is extended or adjusted under 35 U.S.C. 154(b) by 0 days.

(21) Appl. No.: 09/647,823

(22) PCT Filed: Apr. 3, 1998

(86) PCT No.: PCT/UA98/00005
§ 371 Date: Dec. 7, 2000
§ 102(e) Date: Dec. 7, 2000

(87) PCT Pub. No.: WO99/51412
PCT Pub. Date: Oct. 14, 1999

(51) Int. Cl.⁷ .................................................. B29B 17/00
(52) U.S. Cl. ............................ 521/45.5; 241/23; 241/65
(58) Field of Search ........................................ 521/45.5

(56) References Cited

U.S. PATENT DOCUMENTS 4,813,614 A * 3/1989 Moore .......................... 241/23
5,758,831 A * 6/1998 Collins ......................... 241/23

* cited by examiner

Primary Examiner—Paul R. Michl

(57) ABSTRACT

A device for destroying tires with metallic cords using electric discharges, which comprises an arrangement for cutting off tire sidewalls, an arrangement for delivering the tires with cut sidewalls for destruction, a tire destruction system in the shape of a pulse-discharge unit based on capacitors, which system is provided with an axially symmetrical means for connection to metallic cords in the form of two current conducting fixing members having the shape of truncated cones on the side of their working surfaces and means for discharging the products of destruction. In order to improve the efficiency of destroying tires having various dimensions whose main portion of the cord wires, after cutting off sidewalls, cannot be brought into direct galvanic contact with the pulse current source the axially symmetrical means is provided with a current conducting protrusion which is arranged coaxially relative to the two current conducting fixing members and which is galvanically connected to one of them while electrically isolated from the other. This device may further include a system for destroying the sidewalls comprising a support assembly for placing cut-off sidewalls, at least one inductor connected to the pulse-discharge unit, and a clamp.

21 Claims, No Drawings

DEVICE FOR DESTROYING TIRES WITH METALLIC CORDS USING ELECTRIC DISCHARGES

TECHNICAL FIELD OF THE INVENTION

The present invention relates to a device and method for scrapping and destroying tires with metallic cords, using electric discharges. The device is designed to separate metal and rubber components for their subsequent separate salvage and retrieval, utilizing known, conventional techniques, such as melting the metal and forming rubber crumb for use in the production of flexible pavement and rubber articles, such as roofing, hydraulic insulating materials, heat-insulating and sound-insulating materials.

BACKGROUND OF THE INVENTION

Pneumatic vehicle tires that cannot be repaired or refurbished are a major source of the environmental pollutants and are, at the same time, however, a valuable source of recoverable and recyclable refuse. That is why the recovery of salvageable materials from such tires is a critical issue, especially in the more economically developed, and higher population density countries. Technological means for the solution of this problem must be adapted compatible basic conditions, such as ecological safety, economy and possibility of sufficiently complete salvaging of tires.

Typical tires manufactured today, having metallic cord reinforcements, usually referred to as "steel-belted" tires, have an outer tread surface that comes in contact with the road. The tread is made from rubber only. The tread is attached to two shoulders, one at either side of the tread strip. Each shoulder has a sidewall attached to it. Each sidewall terminates in a bead, which enables the tire to be mounted on and fit into an outer edge of a wheel. The tire has an inner carcass that is typically made from a corded textile material. The breaker is a bracing ply found below the tread. In steel-belted radial tires, the breaker typically includes two layers of metallic cord material. Each layer contains a plurality of separated metallic wires that are surrounded by rubber. The wires in adjacent layers are typically oriented at an angle of about ±70° with respect to a central geometric axis through the tire.

The simplest solution to the problem of the disposal of scrap tires, incineration, was widely used in many countries for many years. Up to 45% of worn-out tires in Germany and The Netherlands, and up to 40% of worn-out tires in Japan used to be incinerated (Tire Recycling Plant Tire Up, "Modern Tire Dealer", 1987, No. 8, p. 6). However, incineration is accompanied by the formation of a complex of toxic substances, particularly sulfur-containing substances, the release of which into the atmosphere is an environmental hazard that far outweighs any benefits achieved in the recovery of residual metals and the recovery of heat generated by the incineration process.

Therefore, it is more preferable to utilize other technological means to provide for the destruction of worn-out tires and achieve the separation and recovery of useable rubber and metal by-products.

One alternative to incineration that is widely practiced is mechanical crushing. Devices for mechanically crushing tires, which operate at ambient temperature are known ("Gummibereitung", 1987, Bd. 63, No. 10, p. 102–104). Other known devices are based on the deep freezing of the rubber component of the tires (Vorbildliches Recycling alter Reifen in Kall/Eitel, "Gummibereitung", 1987, Bd. 63, No. 10, p 97–100). Both mechanical crushing and deep freezing processes are followed by the separation and recovery of components, however, the yields of useable materials are typically quite low.

Processes based on the mechanical shredding of resilient rubber from tires, together with the metallic cord content, followed by crushing of the shreds, are generally highly energy consuming and have low efficiency. Because of the low heat transfer coefficient of rubber, the size of tire shreds to be frozen in deep freezing processes is limited to particles that have a maximum dimension of not greater than 3 cm, which also leads to an increase in the specific energy consumption for shredding and mechanical crushing. Frozen pieces of rubber also do not result in homogeneous (in terms of size grading) semi-finished products. This also results in a certain portion of rubber being discharged together with the metal during magnetic separation.

It is also known that an electric-heat pre-treatment of tires reduces the loss of rubber and simplifies the separation of metallic cords.

In the simplest of devices utilizing this process (DE 2900655 A1), the device itself typically includes the following components:

first conveying means for delivering tires that have had their sidewalls removed to further processing equipment for complete destruction;

a tire destruction system in the form of a current source provided with contacts for connection to metallic cords, such that the source heats the cord wire and causes burning of the adjacent plies of rubber; and second conveying means for transporting and discharging the by-products of tie destruction from the processing area.

Use of an electric-heat treatment based tire destruction process, over a prolonged period of time, is characterized, however, by one of the above-mentioned disadvantages of tire incineration, albeit to a lower degree, namely, with the discharge of toxic materials that pollute the atmosphere and are dangerous to workers and persons in general. In addition, processes requiring lengthy periods of heating are not efficient and have a high specific energy consumption. Moreover, the devices of such processes are effective only in processing those tires having metallic cords that thread through the breaker strip from one sidewall to the other, because only in such case, can substantially all cord wires be brought into secure electrical contact with a source of current, after the sidewalls have been cut off. Finally, the use of such a device creates a problem of separate salvaging of cut-off sidewalls.

Devices for heating the entire mass of metal inside the tires are known, and are provided, for example, in devices that utilize inductive heaters, such as are disclosed in German patent DE 3911082 A1 and European patent EP 0478774 A1. There are, however, a number of other disadvantages in the electric-heat destruction of tires that are more difficult to overcome.

Such other disadvantages can be overcome with the help of electric pulse destruction of tire cord wires. Such a process generally includes a step of passing short pulses of electric current of high density and power through the cord wires. This leads to heat emission, mainly at the boundaries of crystal grains of metal, and to the destruction of tire cord wires in a dangerous and potentially explosive manner.

One such device of this type is known in the art and is described in Russian patent RU 2050287. The device includes:

means for cutting off tire sidewalls (in one embodiment);

means for delivering tires for destruction;
a tire destruction system comprising:
- a pulse-discharge unit based either on a capacitor bank or on an accumulative reactive LC-circuit, and
- an axially symmetrical means for galvanic or electromagnetic connection of the pulse-discharge unit to a metallic cord made respectively either in the form of two current conducting members for fixing the tire to be destroyed mounted for relative reciprocating motion and having the working surfaces in the shape of truncated cones facing each other (by the smaller bases in particular) or in the form of the primary winding of a transformer that in any case must be coaxial with the tire to be destroyed and for this reason can be located either along the geometric axis of the tire or encompass the tire;
- at least one means for discharging the products of the destruction from the working area and, preferably, protective chamber.

The tire destruction system based on the accumulative reactive LC-circuit and the means for electromagnetic connection of the pulse-discharge unit to a metallic cord in the form of the primary winding of a transformer seems to be preferential as far as it is serviceable for destroying the whole tires a priori. However, the experimental study has shown that the galvanic connection between the pulse current source and metallic cords (with the sidewalls being cut off) is more profitable in terms of energy than the electromagnetic connection.

Actually, in the case of the galvanic connection of tire cord wires to the bank of capacitors, the specific consumption of electricity per unit of mass of metal segregated from the tires essentially does not depend on the whole mass of metal in the tire and happens to be the lower the higher is the energy density in the pulse and the shorter is the pulse. Moreover, eddy currents can be induced powerful enough to destroy the cord wires even in that portion of cords (minor as a rule) that fails to come in galvanic contact with the pulse-discharge unit (e.g., because of inconvenient fit to the current conducting fixing members).

As for electromagnetic (transformer) transfer of energy from a reactive LC-circuit to metallic tire cord, the greater the mass (and inductance) of the metal contained in the tire to be destroyed, the less is its efficiency.

However, there are tires wherein cutting off the sidewalls does not reveal the ends of a large proportion of cord wires that cannot be efficiently destroyed with galvanic connection to the pulse-discharge unit by the known methods. These are large size tires, as a rule, whose destruction in the whole state (without cutting off the sidewalls) in accordance with a 'transformer circuit' is also not efficient because of the mentioned reasons.

Thus, the improvements in the design of a device for the electric pulse destruction of tires having metallic cords after cutting off the sidewalls, according to the present invention, are a great improvement in the state of the art.

SUMMARY OF THE INVENTION

Accordingly, it is one object of the present invention to develop a device for scrapping and destroying rubber tires, which contain metallic cords, that is capable of salvaging and separating the rubber and metal components as useable by-products.

It is another object of the present invention to develop a device that is capable of salvaging and separating the rubber and metal components of the breaker layer and the sidewalls.

It is another object of the present invention to develop a device and method for scrapping and destroying tires, wherein metal separation of each part of the tire is accomplished separately The present invention is based on the need for creating, by way of improving the design on the whole and particularly the axially symmetrical means for galvanic connection of the pulse-discharge unit to a metallic cord, firstly, such device for destroying tires with metallic cords using electric discharges, which provides for effective destruction of tires of different sizes whose substantial portion of cord wires cannot be brought into direct galvanic contact with a pulse current source after cutting off the sidewalls, and secondly, creating, by way of enhancing this device with a means for destroying the cut-off sidewalls, a still more improved device that provides for substantially complete separation of metal from rubber in tires.

The first main part of the problem is solved in that in the device for destroying tires with metallic cords using electric discharges comprising means for cutting off the sidewalls of tires, means for delivering tires with cut-off sidewalls for destruction, a tire destruction system in the shape of a pulse-discharge unit based on capacitors which is provided with an axially symmetrical means for connection to metallic cords in the form of two current conducting fixing members having the shape of truncated cones on the side of their working surfaces and at least one means for discharging the products of the destruction from the working zone, according to the invention, the axially symmetrical means for connection of the pulse-discharge unit to metallic cords is provided with an additional current conducting protrusion which is arranged coaxially relative to both current conducting fixing members, being galvanically connected to one of them and electrically isolated from the other.

Actually, the pulse current flows in the opposite directions through said protrusion and through the cord wires of the tire being destroyed when the device of the invention is used. Such arrangement provides for the simultaneous achievement of two technological effects:

firstly, the combined electrical inductance of said means for connection of the pulse-discharge unit to a metallic cord and the very metallic cord decreases and, correspondingly, the duration of the pulse shortens while the amplitude and density of current increase therein;

secondly, according to the Ampere law, the conductors along which the currents flow in opposing directions come in mechanical interaction, and hence a repulsive mechanical impulse (so called "magnetic impulse") appears between said protrusion and all cord wires of the tire being destroyed, said impulse growing in proportion to the increase in the amplitude of the current in the destructive pulse.

Combination of said effects allows the efficiency of separation of metallic cord from rubber to be essentially increased when destroying tires (especially of a large size) and particularly in case of incomplete galvanic contact between cord wires and the pulse-discharge unit.

Additional embodiments of the apparatus of the present invention, which contain additional features, which may be combined, are within the scope of the invention.

The first additional characteristic feature consists in that the additional current conducting protrusion is made in the shape of a central rod, which is preferable in destroying small size tires.

The second additional characteristic feature consists in that the central rod is provided with a support platform, whereon a dielectric pad and one of the fixing members are placed, and is rigidly secured to the immobile base at one side, while it is operatively connected to the second fixing member at the other side. Such arrangement of the central rod and its interconnections with the remaining parts of the axially symmetrical means for connection of the tires to be destroyed to the pulse-discharge unit simplifies the delivery of tires and increases reliability of their holding at the discharge of capacitors.

The third characteristic feature, additional to the second feature, consists in that the central rod and the second fixing member are made in the form of a 'bolt-nut' couple, which allows tires of different standard sizes to be destroyed by controlling the force of the contact between the cut sidewalls of tires and fixing members depending on the rigidity of tires.

The fourth characteristic feature, additional to the second feature, consists in that the central rod is provided with a stop in the middle part, while the second fixing member is made in the form of a knock-down coupling. This arrangement is preferable in a line destruction of tires of the same standard size.

The fifth additional characteristic feature consists in that the additional current conducting protrusion is made in the shape of a peripheral ring, which allows a substantial simplification of the means for guarding the zone of the tire destruction.

The sixth characteristic feature, additional to the fifth feature, consists in that the peripheral ring is made in the form of the side wall for a 'bottom-cover' couple comprising two parts overlying one another and having ring shaped inner sides as well, which essentially turns this part of the device into a protective chamber.

The seventh additional characteristic feature, directed to the solution of the second part of the problem, consists in that the device for destroying tires with metallic cords using electric discharges is additionally provided with a system for destroying the cut-off sidewalls, which comprises an inductor connected to the pulse-discharge unit, a support assembly for the cut-off sidewalls and a clamp mounted for reciprocating motion. Thus, a complete destruction of tires with the use of electric discharges is provided.

The eighth characteristic feature, additional to the fifth feature, consists in that the system for destroying the sidewalls is provided with a second inductor also connected to the pulse-discharge unit, which facilitates destroying the sidewalls having the remainder of cord wires.

BRIEF DESCRIPTION OF DRAWINGS

The invention is further explained by way of detailed description of the design and operation of the claimed device for destroying tires with metallic cords using electric discharges with reference to the accompanying drawings, in which:

FIG. 1 is a block diagram of the device of the invention;

FIG. 2 is a block diagram of the pulse-discharge unit based on high-voltage capacitor modules provided with a remote control panel;

FIG. 3 is a circuit diagram of a high-voltage capacitor module included in the pulse-discharge unit;

FIG. 4 is the axially symmetrical means for galvanic connection of the pulse-discharge unit to metallic cords (provided with a central protrusion);

FIG. 5 is the axially symmetrical means for galvanic connection of the pulse-discharge unit to metallic cords (provided with a peripheral protrusion);

FIG. 6 is a lay out diagram of symmetrical arrangement of the high-voltage capacitor modules with respect to the means for galvanic connection of the pulse-discharge unit to metallic cords;

FIG. 7 is a lay out diagram of an asymmetrical arrangement of the high-voltage capacitor modules with respect to the means for galvanic connection of the pulse-discharge unit to metallic cords;

FIG. 8 is a line diagram of the system for destroying the cut-off sidewalls;

FIG. 9 is a line diagram of the system for destroying the cut-off sidewalls having a remainder of metallic cords.

DETAILED DESCRIPTION OF THE BEST MODE FOR CARRYING OUT THE INVENTION

Referring to FIG. 1, the claimed device for destroying worn out tires with metallic cords generally comprises the following main parts:

an arrangement 1 (of any design) for cutting off tire sidewalls, which can be made, for example, in the shape of two or more commercially available cutting heads and which provides for access to the ends of the majority of cord wires in the tire breaker;

an arrangement 2 (of any design as well) for delivering the cut-off tires for destruction, made so as to accommodate for the size and mass of tires, e.g. in the shape of a commercially available belt conveyer or moving carrier and/or an automatic manipulator;

a destruction system 3 based on a pulse-discharge unit 4 and axially symmetrical 30 means 5 for mainly galvanic connection of the pulse-discharge unit 4 to metallic cords;

a remote control station 6 for receiving data on the conditions of the destruction system 3 and supplying the latter with the controlling information;

means 7 (of any design) for discharging the products of the tire destruction from the working zone, which can comprise, for example, a mechanical conveyer for delivering pieces of metal-free rubber to further mincing and a pneumatic conveyer for delivering metal particles into a collector (not shown).

Means 8 for crushing and milling rubber is expedient to be arranged at the output of the device for destroying worn out tires. Similar to the equipment used now for production of rubber crumb from tires having textile cords, it can comprise: a commercially available mechanical crusher, at least one mechanical mill (for respective pre-crushing and further mincing of pieces of rubber into the crumb of prescribed size) and a set of sieves.

The pulse-discharge unit 4 (FIG. 2) is made on the basis of at least one, preferably a plurality of similar high-voltage capacitor modules 9 for accumulation of electrical charges and their simultaneous pulse discharge on the metallic cords of the tires being destroyed.

The pulse-discharge unit 4 is equipped with:

a power unit 10 for charging the high-voltage capacitor modules 9, which generally 10 comprises a transformer and a rectifier (not shown);

a unit 11 for protection of high-voltage equipment from sparking and possible short circuiting in the electric circuits, which provides for control of the proper operation of high-voltage components with cutting down the wrong ones and indication in the way known in the art, and a synchronizer 12 for synchronously energizing the high-voltage capacitor modules 9, which is generally equipped with a high-voltage low-current single-pulse generator and connected to the control inputs of standard, electronic gaps of all the high-voltage capacitor modules 9.

Each module 9 (shown in FIG. 3) comprises at least one, preferably a plurality of high-voltage capacitors, well known to those skilled in the art and thus not shown in drawings, connected in parallel and a standard electronic gap for their connection to the metallic cords of the tires to be destructed through said means 5.

The axially symmetrical means 5 for galvanic connection of the high-voltage capacitor modules 9 to metallic cords (FIGS. 4 and 5) independently of the form of arrangement comprises two current conducting fixing members 13 and 14 having working surfaces in the shape of truncated cones and an additional current conducting protrusion located coaxially to both said fixing members 13 and 14, galvanically connected to one of them and electrically isolated from the other by means of a dielectric pad 16.

The first preferable embodiment of the axially symmetrical means 5 (FIG. 4) comprises an additional current conducting protrusion 15 in the shape of a central essentially cylindrical rod whose diameter must preferably allow a slide fit of the tire to be destroyed about its inner diameter. Such rod-protrusion 15 is preferably provided on its one side with a round (in plan) supporting platform for locating the dielectric pad 16 and the second fixing member 14 thereupon and rigidly connected, for example, to a stationary casing of a protective chamber (not shown); and on its other side, the rod-protrusion 15 supports the first fixing member 13 during operation.

To provide for such support, the fixing member 13 and the rod-protrusion 15 may be fabricated in different ways, e.g., in the form of a 'bolt-nut' couple (preferably with a buttress thread), as it is schematically shown in the drawing. Another variant is possible (not shown but understood by those skilled in the art) wherein the rod-protrusion 15 has a shoulder in its middle portion in the shape of a plurality of radial protrusions or a continuous ring collar, and the fixing member 13 is made in the form of an attachable-detachable and assembleable-disassembleable coupling, also known as a knock-down coupling, having at least two portions to be brought in contact with said shoulder in the operative mode.

However, independently of the shape of fabricating the fixing member 13 when forming the protrusion 15 in the shape of a rod, a protective chamber is needed (not shown).

The second preferable embodiment of the axially symmetrical means 5 (FIG. 5) comprises an additional current conducting protrusion 15 in the shape of a peripheral ring whose inner diameter preferably allows a slide fit of the tire to be destroyed about its outer diameter. It is expedient that the peripheral ring-protrusion 15 be made in the shape of a side wall of a 'bottom-cover' couple comprising two parts of the same diameter, that overly one another and have ring shaped inner sides, and being essentially a protective chamber.

The following conditions of location of high-voltage capacitor modules 9 with respect to the axially symmetrical means 5 are expedient to be complied with for additional (besides of electrical) synchronization of operation of all the high-voltage capacitor modules and reducing their total capacity necessary for destruction of tires of each specific standard size:

these modules 9 must be located in symmetry substantially equiangularly and equidistantly from the protrusion 15, as shown in FIG. 6, if the shape, sizes and mutual arrangement of the means of service and guarding of the destruction system 3 allow such variant, and all supplying electric wires must have as closely similar and as small as possible magnitudes of inductance;

in case of the compelled asymmetry of the arrangement of these modules 9 relative to the protrusion 15 (FIG. 7), the equalization and minimization of the magnitudes of inductance of the supplying electric wires can be provided by the changes in their sizes and/or shape (e.g., when utilizing strip transmission lines, the growth of inductance can be compensated by the corresponding increase in their width when increasing the length).

The device of the invention is expedient to be furnished with an additional system for destruction of sidewalls, which generally comprises (FIG. 8):

inductor 17 made, for example, in the form of one or more turns of a conductor connected to the pulse-discharge unit 4, a support assembly 18 for placing the sidewalls, and a movable clamp 19 mounted particularly for reciprocating motion.

In case the cut-off sidewalls of tires contain the remainder of a metal cord 20, the system for destruction of sidewalls is expedient to be completed with a second inductor 21 also connected to the pulse-discharge unit 4 either directly or in parallel with the inductor 17 shown in FIG. 9.

The device of the invention is used in the following way.

After cutting off sidewalls in the arrangement 1, each next tire is delivered by the arrangement 2 to the destruction system 3 and is fixed between the current conducting fixing members 13 and 14 of the axially symmetrical means 5.

When utilizing the axially symmetrical means 5, such as shown in FIG. 4, a tire is placed on the current conducting protrusion-rod 15 against the lower (stationary) current conducting fixing members 14, and then the upper current conducting fixing members 13 is located (e.g., by screwing), the cut sidewalls being fixed and the naked (due to cutting) ends of the cord wires being introduced in galvanic contact with pulse-discharge unit 4.

Similarly, when utilizing the axially symmetrical means 5 shown in FIG. 5, a tire is as placed on the lower (stationary) current conducting fixing members 14 on the 'bottom' of the lower part of the peripheral ring-protrusion 15, and then its upper part is located in the way of a 'cover', whose weight performs fixing of the cut sidewalls.

The power unit charges all the capacitors of the high-voltage capacitor modules 9 from stationary mains supply or any other source of power in accordance with the commands from the remote-control station 6, and then the synchronizer, 12 initiates these modules 9. A current pulse, passed through the cord wires brought into galvanic contact with the current conducting fixing members 13 and 14, generates eddy currents also in those wires whose ends were left not revealed after cutting off the sidewalls.

When doing this, so much intensive emission of heat takes place substantially in all cord wires along the boundaries of crystal grains of metal during several milliseconds that the metal bursts, and the major mass of the formed small particles (usually powder like) destroy the tire breaker and tread and fly out from the channels produced in the rubber mainly as the result of its mechanical repulsion and in minor measure as the result of its burning along the surface of contact with the cord wires.

Due to the short duration of the current pulse and consumption of the major portion of energy for destroying the metallic cord, the rubber mass has no time to warm up notably. That is why substantially no volatile toxic substances are given off therefrom, and the process is environmentally friendly.

Independently of the fact whether the metallic cord of the tire being destroyed happens to be the outer (FIG. 4) or the inner (FIG. 5) electrode of the coaxial couple, the axially symmetrical means 5 equipped with the protrusion 15 provides for the opposite direction of currents in metallic cords and in the protrusion 15 at the pulse discharge of the high-voltage capacitor modules 9. This promotes, as it was mentioned above, the decrease in the combined electric inductance of said means 5 and metallic cords, shortening the duration of the electric pulse and increasing the amplitude and density of the current therein and, secondly, manifestation of repulsive mechanical impulses in metallic cords of the tire being destroyed resulting from the 'magnetic impulse', which are the greater the higher is the amplitude of the current in the destructive electric pulses.

Similarly, each cut-off sidewall is placed on the support assembly 18 and fixed with the clamp 19; then the inductor 17 is brought thereto (FIG. 8) or (in case of presence of the remainder of cord wires in the sidewall) both inductors 17 and 21 (FIG. 9) are brought thereto, and metal is segregated from rubber at the pulse discharge of high-voltage capacitor modules 9 on the inductor(s).

The products of tire destruction are discharged from the working zone with the help of the means 7 by way of supplying pieces of rubber freed from metal to the means 8 for crushing and milling, and metal particles are sent to a collector, after which the cycle of destruction is repeated. The unit for protection of high-voltage equipment from sparking and possible short-circuiting in the electric circuits controls the operation of the device, indicates failures and reduces the possibility of using the wrong components.

INDUSTRIAL APPLICABILITY

The device of the invention is easy to fabricate commercially. It is highly effective in separating metallic cords from rubber in tires.

What is claimed is:

1. A device for destroying scrap tires made from a metallic-cord-reinforced rubber material, each tire having an outer rubber tread attached about an outer closed continuous periphery of a surface-contacting rubber endwall of the tire, the endwall also including a breaker layer containing a plurality of metallic cord reinforcing strands, and the endwall having an opposing pair of side edges, and the tire further having a pair of shoulders, with one shoulder attached rubber sidewalls, with one sidewall being attached to each side edge of the endwall, each sidewall also having a metallic wire-containing bead attached thereto for enabling the tires to be mounted on a wheel; and for recovering and separating rubber and metal by-products produced from the tire in the scrapping process; the device comprising:

a.) at least one sidewall removal means for initially removing the sidewalls from the tire, wherein ends of strands of metallic cord material in the tire are exposed;

b.) at least one inlet conveying means for conveying tire from which the sidewalls have been removed to tire scrapping means for further processing into scrap rubber and metal components;

c.) the tire scrapping means including an electrical pulse-discharge unit containing a plurality of high-voltage electrical storage capacitors, the electrical pulse-discharge unit being provided with a plurality of tire cord connection means for connection to exposed ends of metallic cords in the tires from which the sidewalls have been removed, such that the tire cord connection means includes two electrical current-conducting fixation members, each electrical current-conducting fixation member having a frusto-conical shape, with the two electrical current-conducting fixation members being symmetrically distributed around a central axis of the electrical pulse-discharge unit, such that the frusto-conical ends of the two fixation members are inwardly directed toward each other along the central axis of the pulse-discharge unit, and such that a tire from which the sidewalls have been removed is mountable over the frusto-conical ends of the two fixation members and between the two fixation members, and further such that the electrical pulse-discharge unit also includes an electrical current-conducting element that is positioned coaxially with respect to both electrical current-conducting fixation members, and is electrically connected to one fixation member and electrically isolated from the other fixation member; and d.) at least one outlet conveying and discharging means for conveying and discharging the scrap rubber and metal components of the scrapped tires out of and away from the electrical pulse-discharge unit.

2. The device according to claim 1, wherein the plurality of high-voltage capacitors are connected in parallel, and each capacitor includes a standard electronic gap which is connectable to metallic cords in the tires from which the sidewalls have been removed.

3. The device according to claim 2, wherein the electrical pulse-discharge unit further includes: a power unit for providing an electrical charge to the plurality of high-voltage electrical storage capacitors; a spark protection unit to protect the capacitors from sparking, to prevent short circuits, and to provide operating control over the capacitors and other high-voltage components; and a synchronizer for ensuring that the power unit charges the high-voltage capacitors in a synchronous manner.

4. The device according to claim 3, wherein the power unit includes a transformer and a rectifier.

5. The device according to claim 3, wherein the synchronizer includes a high-voltage, low-current single-pulse generator, and is connected to control inputs of the standard electronic gaps of the high-voltage capacitors.

6. The device according to claim 1, wherein the electrical current-conducting element is a rod, centrally positioned between and coaxial with the two electrical current-conducting fixation members.

7. The device according to claim 6, wherein the rod further includes a support platform, to which is attached a dielectric pad and the electrically connected fixation member, and further such that the support platform is rigidly secured to an immobile base at one side of the platform and is operatively connected at another side of the platform to the electrically isolated fixation member.

8. The device according to claim 7, wherein the rod and the electrically isolated fixation member are operatively connected as a bolt and its cooperating nut, such that the rod is the bolt and the electrically isolated fixation element is the nut.

9. The device according to claim 7, wherein the rod is provided with a stop positioned at a middle part thereof and the electrically isolated fixation member is a detachable coupling.

10. The device according to claim 1, wherein the electrical current-conducting element is a peripheral ring, having an inner diameter sufficiently large to enable the ring to slide over an outer diameter of a tire being scrapped, from which the sidewalls have been removed.

11. The device according to claim 10, wherein the ring is formed as a side wall of an element having two parts of equal diameter that overlie one another and have arcuately-shaped inner sides, the two parts of the ring, when closed, constituting a protective chamber that surrounds the tire being scrapped.

12. The device according to claim 1, further comprising tire sidewall scrapping means (e), for separately scrapping the tire sidewalls removed from the tires to be scrapped by the at least one sidewall removal means in (a).

13. The device according to claim 12, wherein the sidewall scrapping means (e) includes a support assembly for supporting removed sidewalls; a clamp for holding the sidewalls on the support assembly; and an inductor connected to the pulse-discharge unit, for electrically destroying the sidewalls.

14. The device according to claim 13, wherein when the removed sidewalls also contain at least traces of metallic cord reinforcing material, the sidewall scrapping means further includes a second inductor connected to the pulse-discharge unit, for electrically destroying any metallic cord material also found in the sidewalls.

15. The device according to claim 1, further comprising rubber crushing and milling means (f), positioned after the at least one outlet conveying and discharging means (d), to receive the scrap rubber therefrom, for crushing and milling the scrap rubber produced from the scrapping of tires.

16. The device according to claim 15, wherein the rubber crushing and milling means (f) includes: a mechanical crusher for crushing the rubber; at least one mechanical mill for milling and mincing the crushed rubber; and a set of sieves for screening and sorting the milled and minced rubber into rubber crumbs of predetermined sizes.

17. The device according to claim 1 further comprising a protective enclosure for the electrical pulse-discharge unit and the tire being scrapped.

18. A method for destroying scrap metallic-cord-reinforced rubber tires, having an endwall with two side edges and fabricated from an outer rubber tread and a metallic cord-containing breaker layer therebelow; a shoulder attached to each edge of the endwall; a sidewall attached to each shoulder; and a bead, for attachment to a wheel, containing bead wire, attached to each sidewall at an inner edge thereof, the method comprising:

a.) cutting the tire into three parts, including a middle part containing the tire endwall with the tread and breaker layer, such that ends of the metallic cord material in the breaker layer are exposed; and two side parts, each containing a sidewall and corresponding bead and bead wire;

b.) separating the rubber and metal components of the first endwall part of the tire by placing the tire endwall part between two current-conducting fixation members that are electrically isolated from one another, and are individually electrically connected to a pulse-discharge unit, and which have an electrical current-conducting member positioned coaxially to the two fixation members, such that ends of metallic cord wires in the endwall are attached to the electrical current conducting member, and applying electrical current pulses of alternating polarity to the metallic cord wire ends to separate the rubber and metal components of the endwall part of the tire; and c.) separating the rubber and metal components of the second and third sidewall parts of the tire by placing each of the tire sidewall parts on a support assembly, such that a coil of an electrical inductor connected to the pulse-discharge unit concentrically surrounds and is in close proximity to the bead wire in the bead portion of the sidewall part of the tire, and applying electrical current pulses to the metallic bead wire through the inductor, to separate the rubber and metal components of the sidewall parts of the tire.

19. A method for destroying scrap metallic-cord-reinforced rubber tires comprising:

a.) removing the sidewalls from the tire using sidewall-removal means to form a tire from which the sidewalls have been removed to expose ends of the metallic-cord reinforcing material;

b.) conveying the tire from which the sidewalls have been removed to tire scrapping means utilizing inlet conveying means;

c.) mounting the tire from which the sidewalls have been removed on and positioning it between two frusto-conically shaped electrical current-conducting fixation members of an electrical pulse-discharge unit of the tire scrapping means, wherein the two electrical current-conducting fixation members are symmetrically distributed around a central axis of the electrical pulse-discharge unit, such that frusto-conical ends of the two electrical current-conducting fixation members are inwardly directed toward one another, and wherein the electrical pulse-discharge unit further includes an electrical current-conducting element positioned coaxially with the two electrical current-conducting fixation members and is electrically connected to one fixation member and electrically isolated from the other fixation member, connecting the exposed ends of the metallic-cord reinforcing material in the tire from which the sidewalls have been removed to a plurality of high-voltage electrical capacitors of the electrical pulse-discharge unit;

d.) electrically charging the capacitors;

e.) scrapping the tire by converting it into rubber and metal by-products by discharging the charge from the capacitors into the tire; and f.) conveying away and discharging the scrap rubber and metal components of the scrapped tire out of and away from the electrical pulse-discharge unit.

20. The method according to claim 19, further comprising (g) separately scrapping the removed tread from the tire in tread scrapping means that includes at least one electrical inductor connected to the electrical pulse-discharge unit.

21. The method according to claim 20, further comprising (h) producing a screened and sized rubber crumb material of predetermined particle size, by crushing and milling the scrap rubber conveyed out of and away from the electrical pulse-discharge unit, utilizing rubber crushing and milling means to crush, mill, and mince the rubber into a rubber crumb material; and utilizing sieves to screen and sort the rubber crumb material into predetermined particle sizes.

* * * * *